June 23, 1925.  
T. A. HOWARD  
HAND DIP NET  
Filed Aug. 26, 1924
1,543,568
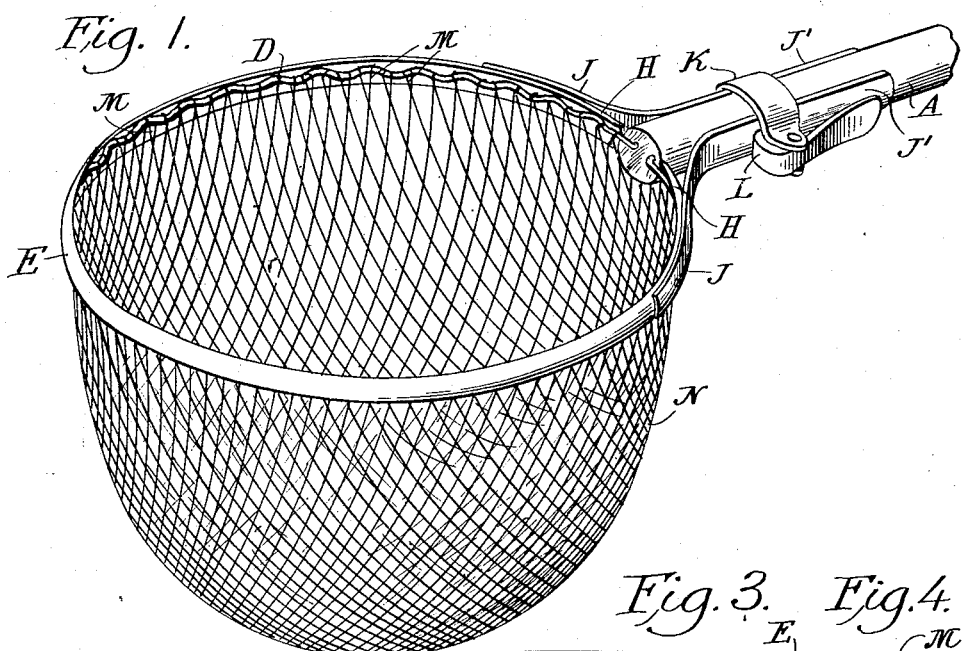
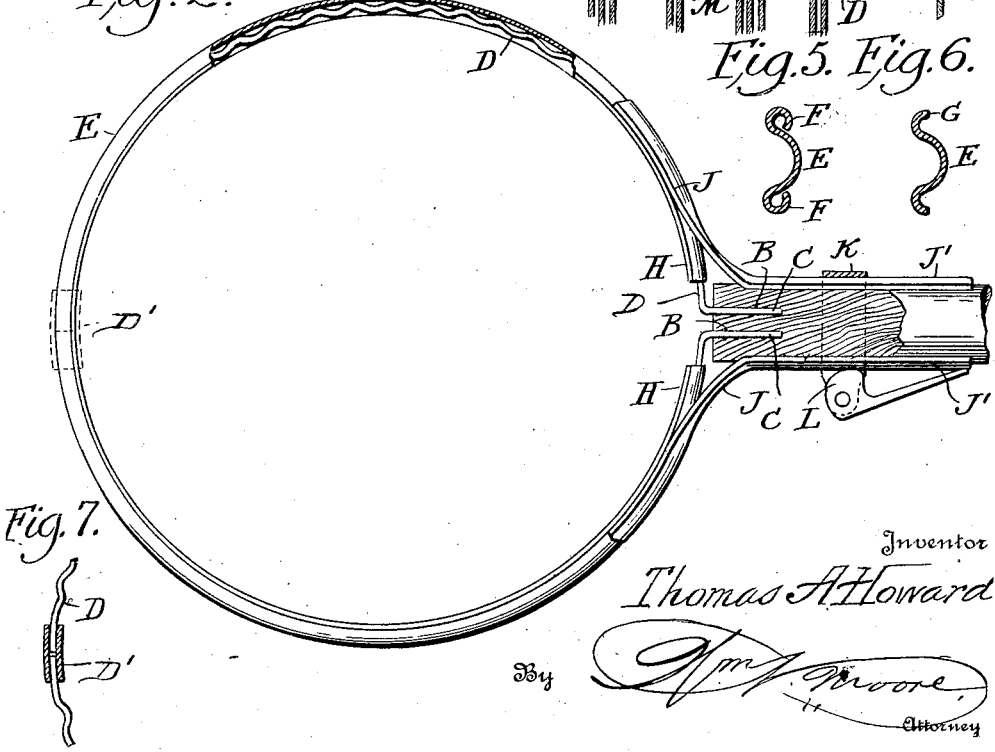
Inventor  
Thomas A Howard  
By  
Attorney Patented June 23, 1925.

1,543,568

UNITED STATES PATENT OFFICE.

THOMAS ANDERSON HOWARD, OF MURRAY, UTAH.

HAND DIP NET.

Application filed August 26, 1924. Serial No. 734,276.

*To all whom it may concern:*

Be it known that I, THOMAS A. HOWARD, a resident of Murray, in the county of Salt Lake and State of Utah, a citizen of the United States, have invented certain new and useful Improvements in Hand Dip Nets, of which the following is a specification.

My invention relates to improvements in hand dip nets such as are used in crabbing and fishing, although such a net may be effectively used for other purposes, and the main object of my invention is the provision of a hand dip net which will conceal and protect the connection of the net proper with the hoop or ring of the net, to overcome the present objection to nets of this character, which is the breakage or wear and tear of the net at its connection with the hoop or ring.

Another object of my invention is the provision of a hand dip net which will protect the net at its point of connection with the hoop or ring insuring a long life to the device, and which will possess great strength and durability to withstand the hard service to which such an article is subjected.

Another object of my invention is the provision of a hand dip net which, all things considered, will possess merit in point of simplicity and cheapness of construction and which in every particular will be thoroughly efficient and practical, and thus fill a long-felt want in an article of this character.

To attain the object stated, my invention consists of a hand dip net embodying novel features of construction and combination of parts for service, substantially as described and defined by the claims, and as shown in the accompanying drawing, in which:

Figure 1 represents a perspective view of a hand dip net constructed in accordance with and embodying my invention.

Fig. 2 represents a plan view of the hoop or ring, certain parts being broken away and shown in section to more clearly illustrate details of construction and arrangement of parts.

Fig. 3 represents a detail view to illustrate the manner of connecting the net with the net receiving and securing element.

Fig. 4 represents a sectional view thereof.

Fig. 5 represents a sectional view of one form of channeled hoop or ring, which may be used in my device, and Fig. 6 represents a sectional view of another form of ring or hoop.

Fig. 7 represents a detail view.

Referring by letter to the drawing, in which similar letters of reference are employed to denote the same part in all the views:

The letter A designates the staff or handle of my net, which is of a suitable length and size, and is provided in one end with the pair of sockets B, which receive the bent ends or terminals C, of the convoluted or corrugated net receiving member D, which is in the form of a circular band or ring and fits within and is protected by the channeled hoop or ring E, which has its edges formed with the rounded portion F, as shown in Fig. 5, or like G, as shown in Fig. 6, while to its inner separated ends H, are connected the curved arms J, of the ferrule forming plates J', which fit around the inner end of the staff or handle, as shown in Fig. 2, and are clamped tightly against said staff or handle by means of the encircling band K, and the hand-operated cam or eccentric L, while the convolutions or bends of the net-securing member D, receive the loops M of the net N, thus making a neat, strong and reliable connection between the net and member, and also concealing and protecting such connection from outside contact or wear and tear.

From the foregoing description, taken in connection with the drawing, the construction and advantages of my net will be readily understood, and it will be at once apparent that the net possesses many advantages over nets of this character in general use, in that the article can be produced at a low price, will protect the net against wear and tear and insure a long life to the net, and that generally the appearance of the article is neat and attractive, all of which is calculated to commend the net to persons requiring such a device.

It will be understood that the invention as shown and described is a practical construction, but I reserve the right to make any changes which come within the scope of my claims and if desired the band D may be connected by a sleeve D', or other changes may be made without departing from my invention.

I claim:

1. A hand dip net, consisting of a handle, a ring connected with said handle, a net securing member mounted in said handle and ring, and a net connected to said net-securing member.

2. A hand dip net, consisting of a handle, a channeled ring connected with said handle, a net securing member connected with said handle and concealed and protected by the channel of said ring, and a net connected to said net securing member.

3. A hand dip net, consisting of a handle, a ring connected with said handle, a convoluted net-securing member mounted in said ring and a net having looped portions secured to the convolutions of said net-securing member.

4. A hand dip net, consisting of a handle, a channeled ring having its ends clamped to said handle, a net-securing member consisting of a convoluted ring arranged in the channel of said ring, and having its terminals anchored in the handle, and a net having loops connected to the convolutions of said net-securing member.

In testimony whereof I hereunto affix my signature.

THOMAS ANDERSON HOWARD.